United States Patent
Kurahashi

(10) Patent No.: US 9,740,270 B2
(45) Date of Patent: Aug. 22, 2017

(54) ELECTRONIC DEVICE

(71) Applicant: KYOCERA Document Solutions Inc., Osaka (JP)

(72) Inventor: Taro Kurahashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 189 days.

(21) Appl. No.: 14/719,897

(22) Filed: May 22, 2015

(65) Prior Publication Data

US 2015/0338899 A1    Nov. 26, 2015

(30) Foreign Application Priority Data

May 23, 2014  (JP) ................................ 2014-107386

(51) Int. Cl.
*G06F 1/32*     (2006.01)
*G01J 5/00*     (2006.01)
*G01J 5/10*     (2006.01)
*G03G 15/00*    (2006.01)
*B41J 29/38*    (2006.01)
(Continued)

(52) U.S. Cl.
CPC ............ *G06F 1/3231* (2013.01); *B41J 29/38* (2013.01); *B41J 29/42* (2013.01); *B41J 29/46* (2013.01); *G01J 5/0025* (2013.01); *G01J 5/10* (2013.01); *G03G 15/5004* (2013.01); *G03G 15/5016* (2013.01); *G03G 15/80* (2013.01); *H04N 1/00* (2013.01); *G03G 15/5091* (2013.01); *G06F 1/3284* (2013.01); *Y02B 60/1267* (2013.01); *Y02B 60/1289* (2013.01); *Y10T 307/773* (2015.04)

(58) Field of Classification Search
CPC . H03K 19/003; G06F 1/3284; Y02B 60/1289; Y02B 60/1267
USPC ........................................ 307/140
See application file for complete search history.

(56) References Cited

U.S. PATENT DOCUMENTS 9,288,354 B2      3/2016  Hirose
2002/0135398 A1*  9/2002  Choi ..................... H03K 17/28
                                                326/93
(Continued)

FOREIGN PATENT DOCUMENTS

JP    2002-006686       1/2002
JP    2014-053734 A     3/2014

OTHER PUBLICATIONS

Notice of Reasons for Refusal mailed by Japan Patent Office on Jun. 7, 2016 in the corresponding Japanese patent application No. 2014-107386.

*Primary Examiner* — Robert Deberadinis
(74) *Attorney, Agent, or Firm* — IP Business Solutions, LLC

(57) ABSTRACT

An electronic device includes: an operation section, a reception section, a human body detection sensor, and a mode switching section. The mode switching section switches the electronic device between a normal operation mode permitting a normal operation and a sleep mode in a power saving state based on presence or absence of a detection signal from the human body detection sensor. Then the mode switching section stops in a case where a state in which the reception section receives an operation made by use of the operation section continues for a predefined period of time the switching between the normal operation mode and the sleep mode based on the presence or absence of the detection signal.

8 Claims, 7 Drawing Sheets

(51) Int. Cl.
*B41J 29/42* (2006.01)
*B41J 29/46* (2006.01)
*H04N 1/00* (2006.01)

(56) References Cited

U.S. PATENT DOCUMENTS

2010/0280671 A1* 11/2010 Lee .................. H02J 9/005
 700/286
2014/0063528 A1 3/2014 Hirose

* cited by examiner

ELECTRONIC DEVICE

INCORPORATION BY REFERENCE

This application claims priority to Japanese Patent Application No. 2014-107386 filed on May 23, 2014, the entire disclosure of which are incorporated herein by reference.

BACKGROUND

This disclosure relates to an electronic device, and more specifically to a technology of energy saving of electronic devices.

In recent years, there have been demands on electronic devices such as image forming apparatuses for achieving power saving in terms of, for example, environment protection. Thus, there has arisen an electronic device having, in addition to a normal operation mode in which an operation is performed in predefined power, a sleep mode in which an operation is performed in less power than that in the normal operation mode.

For example, known is a technology of suppressing power consumption, in an electronic device including an operation section such as a touch panel and a human body detection sensor outputting a detection signal upon detection that an operator has approached, by supplying power to the operation section while the detection signal is outputted from the human body detection sensor (normal operation mode) and not supplying power to the operation section while the detection signal is not outputted from the human body detection sensor (sleep mode).

SUMMARY

As one aspect of this disclosure, a technology obtained by further improving the technology described above will be suggested.

The electronic device according to one aspect of this disclosure includes: an operation section, a reception section, a human body detection sensor, and a mode switching section.

The operation section is operated by an operator.

The reception section receives an operation made by use of the operation section by the operator.

The human body detection sensor outputs a detection signal upon detection that the operator has approached the electronic device.

The mode switching section, based on presence or absence of the detection signal from the human body detection sensor, switches the electronic device between a normal operation mode permitting a normal operation and a sleep mode in a power-saving state, The mode switching section stops the switching in a case where a state in which the reception section does not receive the operation made by use of the operation section and a state in which the detection signal is outputted from the human body detection sensor continues for a predefined period of time.

DETAILED DESCRIPTION

Hereinafter, an image forming apparatus as one example of an electronic device according to one embodiment of this disclosure will be described with reference to the drawings.

Figure 1:
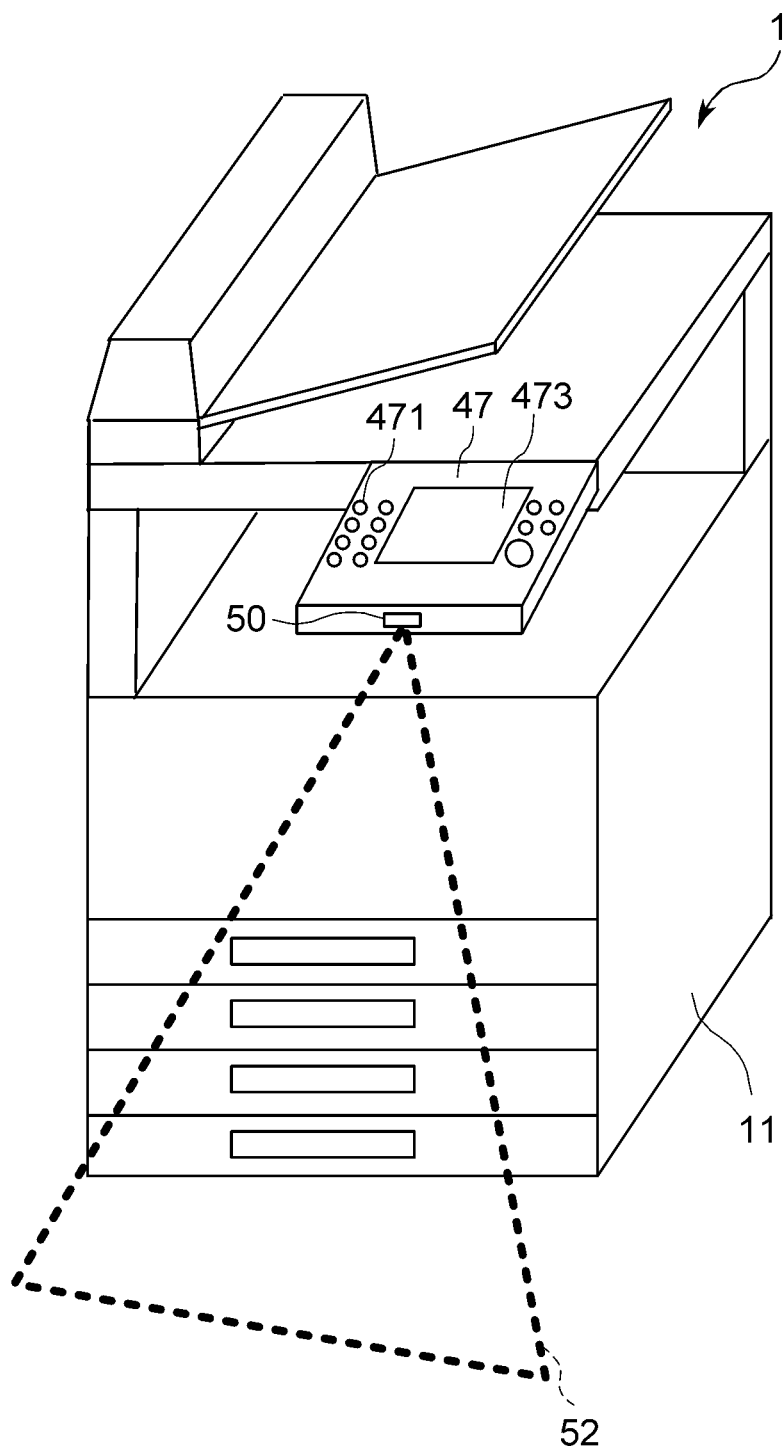
FIG. 1 is a perspective view showing external appearance of an image forming apparatus 1 as one example of an electronic device according to one embodiment of this disclosure.

FIG. 1 is a perspective view showing external appearance of the image forming apparatus 1 as one example of the electronic device according to one embodiment of this disclosure. The image forming apparatus 1 is a multiple peripheral combining a plurality of functions, for example, a copy function, a printer function, a scanner function, and a facsimile function.

In an apparatus body 11 of the image forming apparatus 1, an operation section 47 is provided. The operation section 47 includes a plurality of instruction keys 471 and a display section 473, and receives, from the user, instructions for various operations and processing executable by the image forming apparatus 1. The display section 473 includes a liquid crystal display or an organic EL display having a touch panel function. The instruction keys 471 include: for example, a menu key invoking a Menu; arrow keys for moving a focus of a GUI forming the menu; a Determine key for performing a confirmation operation for the GUI forming the menu; character inputting keys for performing character inputting; numerical inputting keys for performing numerical inputting; etc., and receives, from the user, an operation on, for example, a menu screen displayed at the display section 473.

The image forming apparatus 1 is capable of switching, by a mode switching section 101 (see FIG. 3) of a control unit 10 to be described later, between a normal operation mode permitting a normal operation and a sleep mode in a power-saving state. When the image forming apparatus 1 in the normal operation mode, under control by a display control section 103 (see FIG. 3) of the control unit 10 to be described later, the display section 473 displays various images such as the menu screen, an operation screen, a preview screen, and a print job status check screen. On the other hand, when the image forming apparatus 1 is in the sleep mode, the display section 473 turns into a non-image-displaying state.

On a front surface of the image forming apparatus 1, a human body detection sensor 50 is set. The human body detection sensor 50 is, for example, a pyroelectric infrared sensor, and receives an infrared ray generated by movement of a human body and converts, into a voltage signal, a signal obtained by polarization of a pyroelectric element generated in accordance with a change in the received infrared ray. Then if a voltage value of this voltage signal obtained through the conversion is equal to or larger than a threshold value, the human body detection sensor 50 outputs a high-level signal as a detection signal indicating detection that the user has approached the image forming apparatus 1.

A size of a detection range 52 of the human body detection sensor 50 (detection distance) can be adjusted by changing the threshold value described above. An increase in the threshold value decreases the detection range 52, and a decrease in the threshold value increases the detection range 52.

The mode switching section 101 of the control unit 10, based on presence or absence of the aforementioned detection signal outputted from the human body detection sensor 50, performs switching between the normal operation mode and the sleep mode. For example, upon reception of the detection signal outputted from the human body detection sensor 50 when the image forming apparatus 1 is in the sleep mode, the mode switching section 101 performs switching from the sleep mode to the normal operation mode. This turns the display section 473 into an image-displaying state, resulting in a state for receiving touch inputting by the user through the touch panel function.

Note that a case where the human body detection sensor 50 is a pyroelectric infrared sensor has been described above, but the electronic device according to one embodiment of this disclosure is not necessarily limited this case. The human body detection sensor 50 may be any sensor capable of human body detection, and thus may be, for example, a so-called reflective photosensor. In this case, if an amount of light reflected on the human body is equal to or larger than a threshold value, the human body detection sensor 50 outputs a high-level signal as a detection signal indicating detection that the user has approached the image forming apparatus 1.

Figure 2:
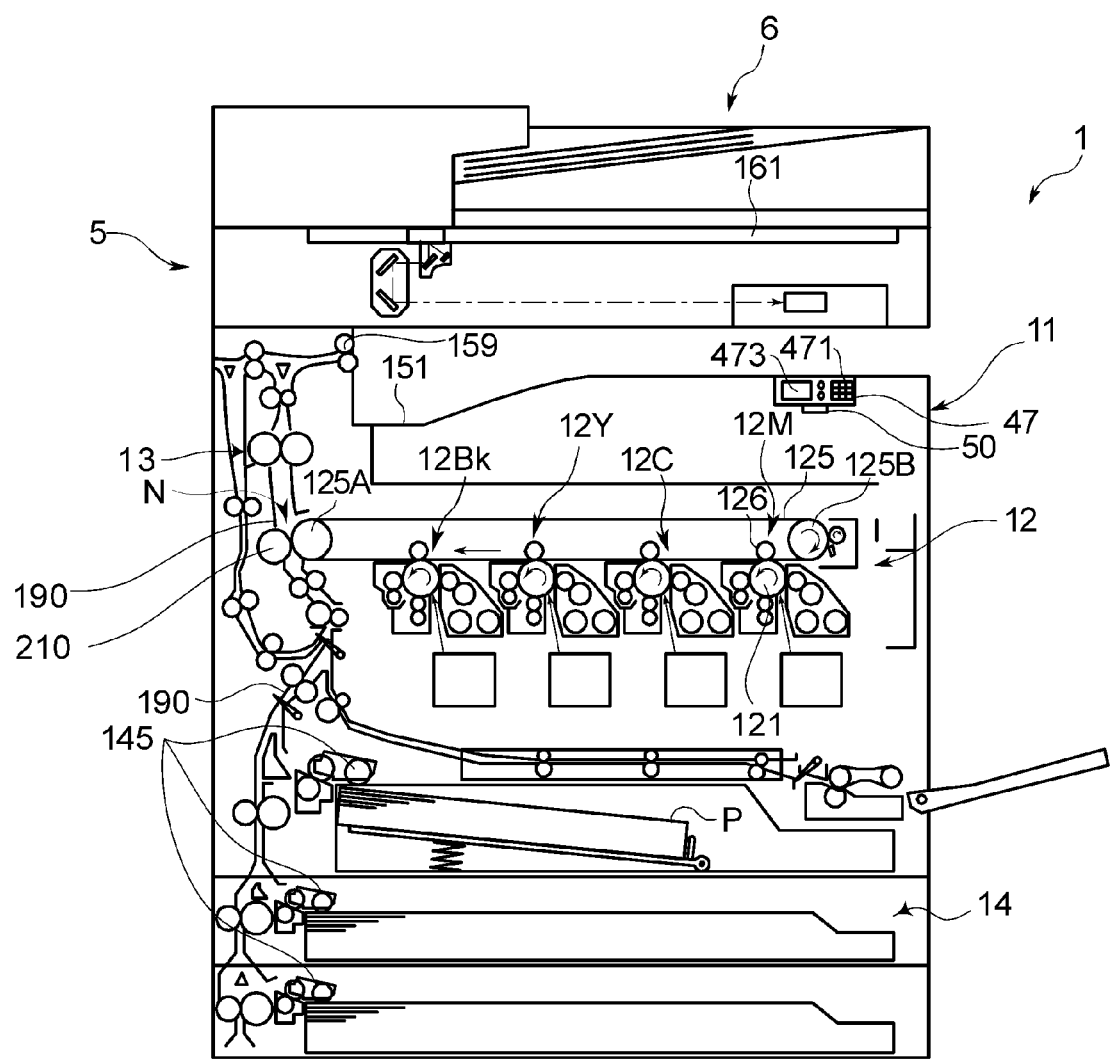
FIG. 2 is a front sectional view showing a structure of the image forming apparatus as one example of the electronic device according to one embodiment of this disclosure.

Subsequently, an inner structure of the image forming apparatus 1 will be described. FIG. 2 is a front sectional view showing the structure of the image forming apparatus 1. The image forming apparatus 1 includes: in the apparatus body 11, an original copy reading section 5, an original copy feed section 6, an image formation section 12, a fixing section 13, a paper feed section 14, the operation section 47, etc.

For an original copy reading operation performed by the image forming apparatus 1, the original copy reading section 5 optically reads an image of an original copy fed by the original copy feed section 6 or an original copy loaded on an original copy loading glass 161, and generate image data. The image data generated by the original copy reading section 5 is saved into, for example, a built-in HDD or a network-connected computer.

For an image formation operation performed by the image forming apparatus 1, based on, for example, image data generated by the image reading operation described above, image data received from a user terminal device such as the network-connected computer or a smartphone, or the image data stored in the built-in HDD, the image formation section 12 forms a toner image on paper P as a recording medium fed from the paper feed section 14. Image formation units 12M, 12C, 12Y, and 12Bk of the image formation section 12 each include: a photoconductive drum 121; a developing device 122 supplying a toner to the photoconductive drum 121; a toner cartridge (not shown) storing the toner; a charging device 123; an exposing device 124; and a primary transfer roller 126.

For color printing, the magenta image formation unit 12M, the cyan image formation unit 12C, the yellow image formation unit 12Y, and the black image formation unit 12Bk of the image formation section 12, based on images formed of their respective color components forming the image data, respectively form toner images on the photoconductive drums 121 through charging, exposing, and developing processes, and transfer the toner images by the primary transfer roller 126 onto an intermediate transfer belt 125 stretched around a driving roller 125A and a driven roller 125B.

The intermediate transfer belt 125 has an image carrying surface, onto which the toner images are transferred, set on an outer circumferential surface thereof, and is driven by the driving roller 125A while abutting a circumferential surface of the photoconductive drum 121. The intermediate transfer belt 125 endlessly runs between the driving roller 125A and the driven roller 125B in synchronization with each photoconductive drum 121.

The toner images of the respective colors transferred onto the intermediate transfer belt 125 are superposed on each other through transfer timing adjustment, turning into a color toner image. A secondary transfer roller 210 transfers the color toner image formed on the surface of the intermediate transfer belt 125, at a nip part N formed by the secondary transfer roller 210 and the driving roller 125A with the intermediate transfer belt 125 in between, onto the paper P transferred from the paper feed section 14 through a conveyance path 190. Then the fixing section 13 fixes the toner images on the paper P thereon through thermal compression. The paper P which has been already subjected to the fixing processing and on which the color image has already been formed is discharged from a loading tray 151 by a discharge roller 159.

Figure 3:
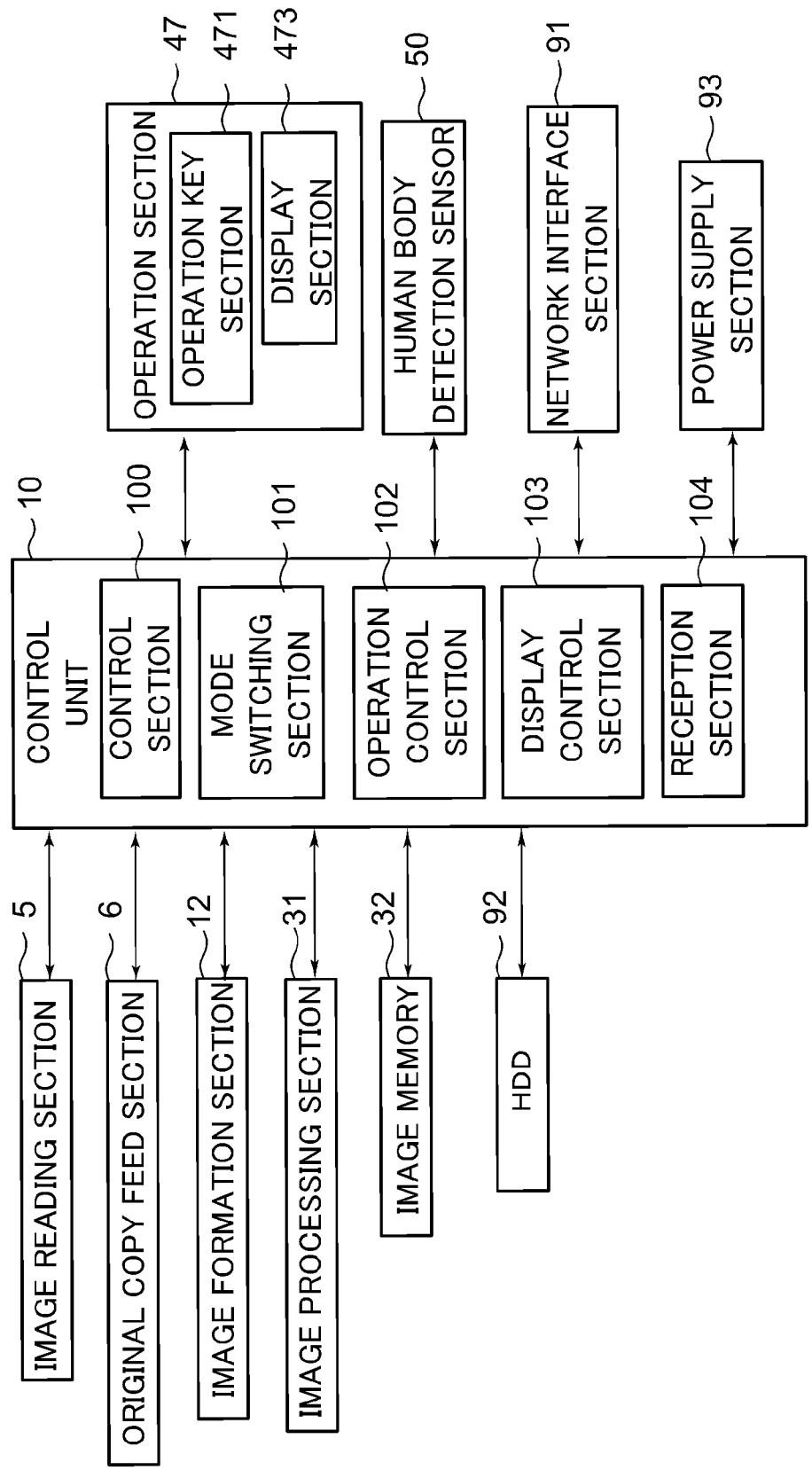
FIG. 3 is a functional block diagram schematically showing main inner configuration of the image forming apparatus as one example of the electronic device according to one embodiment of this disclosure.

Next, inner configuration of the image forming apparatus 1 will be described. FIG. 3 is a functional block diagram schematically showing main inner configuration of the image forming apparatus 1.

The image processing section 31, if needed, performs image processing on the image data of the image read by the original copy reading part 5. For example, the image processing section 31, for the purpose of improving quality after the image formation is performed by the image formation section 12, performs predefined image processing such as shading correction on the image read by the original copy reading part 5.

An image memory 32 is a region temporarily storing the data of the original copy image obtained through the reading by the original copy reading part 5 and temporarily saving data targeted for printing by the image formation section 12.

A network interface section 91 is formed of a communication module such as a LAN board, and performs various types of data transmission and reception with, for example, a computer in a local area via, for example, a LAN connected to this network interface section 91.

An HDD (Hard Disk Drive) 92 is a large-capacity storage device used for saving, for example, the image data outputted from the original copy reading part 5.

A power supply section 93, under control by an operation control section 102, supplies electric power to each of the aforementioned mechanisms, such as the image formation section 12 and the fixing section 13, of the image forming apparatus 1.

The control unit 10 is composed of: a CPU (Central Processing Unit), a RAM (Random Access Memory), a ROM (Read Only Memory), etc. As a result of executing power control programs stored in, for example, the ROM and the HDD 92 described above by the CPU detection signal, the control unit 10 functions as the control section 100, the mode switching section 101, the operation control section 102, the display control section 103, and a reception section 104. Note that the control section 100, the mode switching section 101, the operation control section 102, the display control section 103, and the reception section 104 of the control unit 10 may be each formed by a circuit without depending on the operation based on the power control programs described above.

The control section 100 is responsible for overall control of the image forming apparatus 1.

The reception section 104 receives an operation made by use of the operation section 47 by the user.

The mode switching section 101 has a function of making switching between the normal operation mode and the sleep mode based on presence or absence of the detection signal from the human body detection sensor 50. The mode switching section 101, upon reception of the detection signal outputted from the human body detection sensor 50 when the image forming apparatus 1 is in the sleep mode, makes switching from the sleep mode to the normal operation mode. The mode switching section 101, upon reception of no detection signal outputted from the human body detection sensor 50 for a predefined continuous period of time, makes switching from the normal operation mode to the sleep mode. When the user approaches the image forming apparatus 1, switching from the sleep mode to the normal operation mode is previously performed, which can therefore shorten time required for permitting use of the image forming apparatus 1 by the user. Moreover, when the user moves away from the image forming apparatus 1, switching from the normal operation mode to the sleep mode occurs, which can therefore effectively suppress power consumption of the image forming apparatus 1.

The switching between the normal operation mode and the sleep mode based on the presence or absence of the detection signal of the human body detection sensor as described above can suppress power consumption of an electronic device such as an image forming apparatus, but in case of false detection by the human body detection sensor 50 or its malfunction in a typical electronic device, the switching between the normal operation mode and the sleep mode is not performed properly. In this case, not only the power consumption of the electronic device cannot effectively be suppressed, but also there arise needs for recovery from the sleep mode to the normal operation mode when the user desires to use the electronic device, resulting in a risk of frequent occurrence of a situation that it takes time before start of use of the electronic device, which spoils user-friendliness. Thus, in the image forming apparatus as one example of the electronic device according to one embodiment of this disclosure, in a case where a predefined condition that the human body detection sensor 50 performs false detection or malfunctions, the mode switching section 101 stops the switching between the normal operation mode and the sleep mode based on the presence or absence of the detection signal from the human body detection sensor 50.

More specifically, in a case where both a state in which the reception section 104 does not receive an operation made by use of the operation section 47 and a state in which the detection signal is outputted from the human body detection sensor 50 continues for a predefined period of time, the mode switching section 101 stops the switching between the normal operation mode and the sleep mode based on the presence or absence of the detection signal. Moreover, in a case where the reception section 104 receives the operation made by use of the operation section 47 in a state in which the detection signal is not outputted from the human body detection sensor 50, the mode switching section 101 stops the switching between the normal operation mode and the sleep mode based on the presence or absence of the detection signal.

In a case where the human body detection sensor 50 dose not malfunction and operates properly and a size of a detection range of the human body detection sensor 50 is set appropriately, in a state in which the reception section 104 does not receive the operation made by use of the operation section 47, a state in which the detection signal is outputted from the human body detection sensor 50 does not continue for more than a fixed period of time. Moreover, in a state in which the detection signal is outputted from the human body detection sensor 50, the reception section 104 does not receive an operation made by use of the operation section 47. Thus, in the aforementioned case (1) where both a state in which the reception section 104 does not receive the operation made by use of the operation section 47 and a state in which the detection signal is outputted from the human body detection sensor 50 continues for a predefined period of time and in a case (2) where the reception section 104 receives the operation made by use of the operation section 47 in a state in which the detection signal is not outputted from the human body detection sensor 50, it is assumed that the human body detection sensor 50 has performed false detection or has malfunctioned. Thus, stopping the switching between the normal operation mode and the sleep mode based on the presence or absence of the detection signal can avoid a situation that the switching between the normal operation mode and the sleep mode is not performed properly as a result of the false detection by the human body detection sensor or its malfunction.

In a case where the switching between the normal operation mode and the sleep mode based on the presence or absence of the detection signal is stopped, when execution of predefined kinds of jobs such as an image formation job and an original copy reading job by the image forming apparatus 1 and the reception of the operation made by use of the operation section 47 by the reception section 104 are not performed for a predefined period of time, the mode switching section 101 makes the switching from the normal operation mode to the sleep mode. Moreover, when the execution of the predefined kinds of jobs or the reception of the operation made by use of the operation section 47 by the reception section 104 are performed, the mode switching section 101 makes switching from the sleep mode to the normal operation mode.

The operation control section 102 has a function of generating a power supply control signal and outputting it to the power supply section 93 to thereby control the operations of each of the aforementioned mechanisms, such as the image formation section 12 and the fixing section 13, of the image forming apparatus 1 in the normal operation mode and the sleep mode. For example, the operation control section 102 provides a smaller power supplied to a thermal heater of the fixing section 13 by the power supply section 93 in the sleep mode than in the normal operation mode.

The display control section 103 controls a display operation performed by the display section 473. More specifically, the display control section 103 displays, at the display section 473, various images such as the menu screen, the operation screen, the preview screen, and the print job status check screen in the normal operation mode. On the other hand, the display control section 103 does not display, at the display section 473, the aforementioned various images in the sleep mode.

Figure 4:
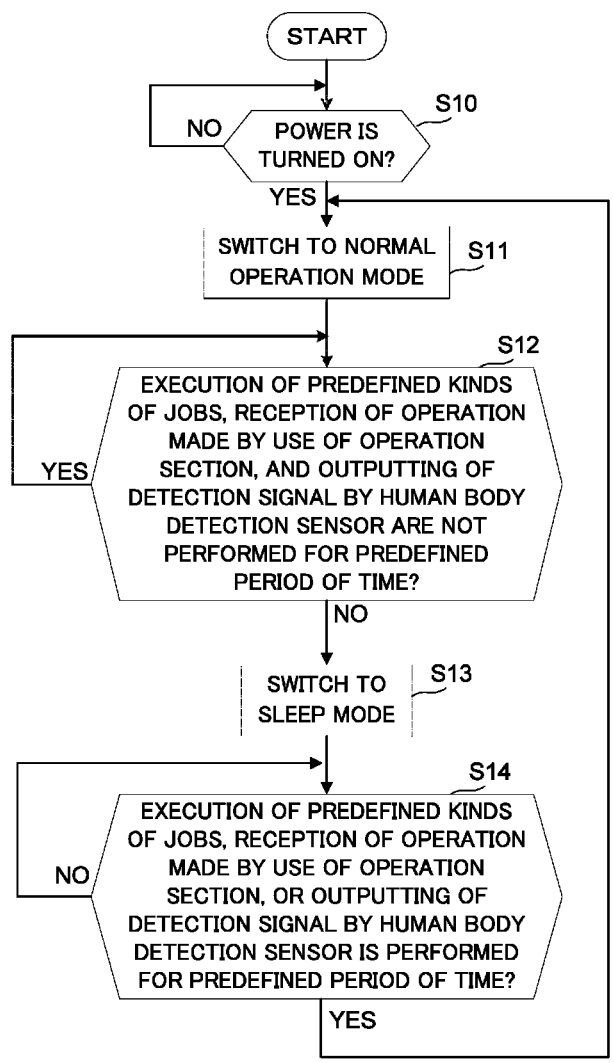
FIG. 4 is a flow chart showing a flow of processing of switching between a normal operation mode and a sleep mode based on presence or absence of a detection signal from a human body detection sensor by the image forming apparatus as one example of the electronic device according to one embodiment of this disclosure.

Next, operations performed by the image forming apparatus 1 provided with the aforementioned configuration will be described. FIG. 4 is a flow chart showing a flow of processing of the switching between the normal operation mode and the sleep mode based on the presence or absence of the detection signal from the human body detection sensor 50 by the image forming apparatus 1.

If a power of the image forming apparatus 1 is turned ON (YES in step S10), the mode switching section 101 switches an operation mode of the image forming apparatus 1 to the normal operation mode (step S11).

After the switching to the normal operation mode, the mode switching section 101 determines whether or not the execution of the predefined kinds of jobs such as the image formation job and the original copy reading job, the reception of the operation made by use of the operation section 47, and the outputting of the detection signal by the human body detection sensor 50 are performed within a predefined period of time (step S12).

If there is processing of any of the execution of the predefined kinds of jobs, the reception of the operation made by use of the operation section 47, and the outputting of the detection signal by the human body detection sensor 50 within the predefined period of time (YES in step S12), the mode switching section 101 keeps the operation mode of the image forming apparatus 1 in the normal operation mode.

On the other hand, if there is no processing of any of the execution of the predefined kinds of jobs, the reception of the operation made by use of the operation section 47, and the outputting of the detection signal by the human body detection sensor 50 within the predefined period of time (NO in step S12), the mode switching section 101 switches the operation mode of the image forming apparatus 1 from the normal operation mode to the sleep mode (step S13).

After the switching to the sleep mode, the mode switching section 101 determine whether or not there is the processing of any of the execution of the predefined kinds of jobs such as the image formation job and the original copy reading job, the reception of the operation made by use of the operation section 47, and the outputting of the detection signal by the human body detection sensor 50 (step S14).

If there is no processing of any of the execution of the predefined kinds of jobs, the reception of the operation made by the use of the operation section 47, and the outputting of the detection signal by the human body detection sensor 50 (NO in step S14), the mode switching section 101 keeps the operation mode of the image forming apparatus 1 in the sleep mode.

On the other hand, if there is the processing of any of the execution of the predefined kinds of jobs, the reception of the operation made by the use of the operation section 47, and the outputting of the detection signal by the human body detection sensor 50 (YES in step S14), the mode switching section 101 switches the operation mode of the image forming apparatus 1 from the sleep mode to the normal operation mode (step S11).

Described in the above is the case where the mode switching section 101 performs the switching between the normal operation mode and the sleep mode based on, in addition to the presence or absence of the detection signal from the human body detection sensor 50, whether or not the predefined kinds of jobs are performed and whether or not the operation made by use of the operation section 47 is received, but the mode switching section 101 may perform the switching between the normal operation mode and the sleep mode based on only the presence or absence of the detection signal from the human body detection sensor 50.

Figure 5:
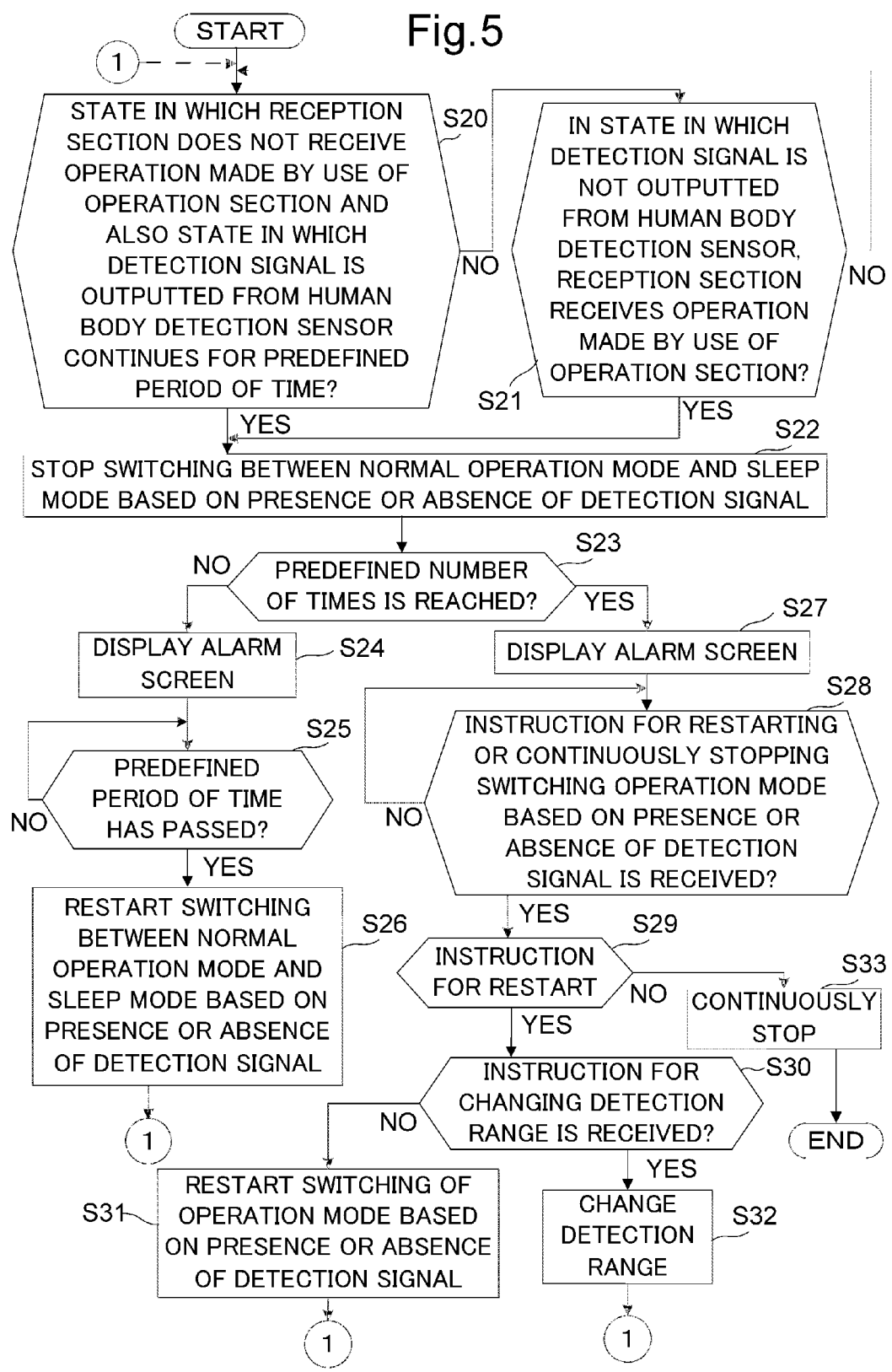
FIG. 5 is a flow chart showing a flow of processing of stopping the switching between the normal operation mode and the sleep mode based on the presence or absence of the detection signal from the human body detection sensor by the image forming apparatus as one example of the electronic device according to one embodiment of this disclosure.

FIG. 5 is a flow chart showing a flow of processing of stopping the switching between the normal operation mode and the sleep mode based on the presence or absence of the detection signal from the human body detection sensor 50 by the image forming apparatus 1.

The mode switching section 101 executes the processing of steps S20 and S21 to thereby determine whether or not to stop the switching between the normal operation mode and the sleep mode based on the presence or absence of the detection signal.

In the processing of step S20, the mode switching section 101 determines whether or not the state in which the reception section 104 receives the operation made by use of the operation section 47 and the state in which the detection signal is outputted from the human body detection sensor 50 continues for the predefined period of time (step S20).

If the state in which the reception section 104 does not receive the operation made by the operation section 47 and the state in which the detection signal is outputted from the human body detection sensor 50 continues for the predefined period of time (YES in step S20), due to assumption that the human body detection sensor 50 is performing false detection or malfunctioning, the mode switching section 101 stops the switching between the normal operation mode and the sleep mode based on the presence or absence of the detection signal (step S22).

On the other hand, if the state in which the reception section 104 does not receive the operation made by the operation section 47 and the state in which the detection signal is outputted from the human body detection sensor 50 does not continue for the predefined period of time (NO in step S20), it is determined whether or not the reception section 104 receives the operation made by use of the operation section 47 in a state in which the detection signal is not outputted from the human body detection sensor 50 (step S21).

If the reception section 104 receives the operation made by use of the operation section 47 in the state in which the detection signal is not outputted from the human body detection sensor 50 (YES in step S21), due to assumption that the human body detection sensor 50 is performing false detection or malfunctioning, the mode switching section 101 stops the switching between the normal operation mode and the sleep mode based on the presence or absence of the detection signal (step S22).

If the reception section 104 receives the operation made by use of the operation section 47 in the state in which the detection signal is not outputted from the human body detection sensor 50 (NO in step S21), due to assumption that the human body detection sensor 50 is performing false detection or malfunctioning, the processing returns to the processing of step S20 without stopping the switching between the normal operation mode and the sleep mode based on the presence or absence of the detection signal.

After the stopping of the switching between the normal operation mode and the sleep mode based on the presence or absence of the detection signal, the mode switching section 101 determines whether or not the number of times of stopping the switching between the normal operation mode and the sleep mode based on the presence or absence of the detection signal (the number of times of stopping) reaches a predefined number of times (step S23).

This number of times of stopping is stored into the HDD 92. This number of times of stopping is reset, for example, in a case where repair is performed by, for example, a service man or in a case where the reception section 104 receives an instruction for resetting the number of times of stopping.

Figure 6:
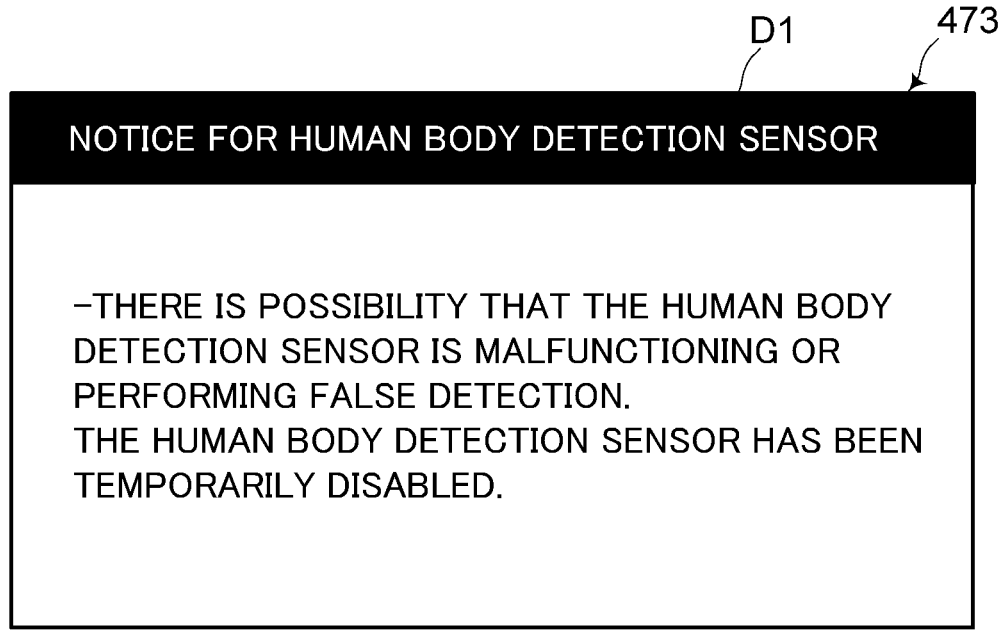
FIG. 6 is a view showing one example of an alarm screen displayed at a display section of the image forming apparatus as one example of the electronic device according to one embodiment of this disclosure.

If the number of times of stopping does not reach the predefined number of times (NO in step S23), the display control section 103 displays, at the display section 473, an alarm screen D1 (see FIG. 6) for alarming that there is possibility that the human body detection sensor 50 is malfunctioning or performing false detection and that the switching between the normal operation mode and the sleep mode based on the presence or absence of the detection signal from the human body detection sensor 50 is to be temporarily stopped (step S24).

Then the mode switching section 101 determines whether or not a predefined period of time has passed since the switching between the normal operation mode and the sleep mode based on the presence or absence of the detection signal was stopped in processing of step S22 (step S25).

If the predefined period of time has passed (YES in step S25), the mode switching section 101 restarts the switching between the normal operation mode and the sleep mode based on the presence or absence of the detection signal (step S26). Then the processing returns to the processing of step S20.

As described above, in the case (1) where the state in which the reception section 104 does not receive the operation made by use of the operation section 47 and the state in which the detection signal is outputted from the human body detection sensor 50 continues for the predefined period of time, and in the case (2) where the state in which the reception section 104 receives the operation made by use of the operation section 47 in the state in which the detection signal is not outputted from the human body detection sensor 50, it is assumed that the human body detection sensor 50 is preforming false detection or malfunctioning, but occurrence of such a situation once or twice cannot necessarily lead to assertion that the human body detection sensor 50 is performing false detection or malfunctioning. For example, the aforementioned situation can occur, for example, in a case where a package is temporarily placed near the image forming apparatus 1. Thus, the mode switching section 101 temporarily stops the switching between the normal operation mode and the sleep mode based on the presence or absence of the detection signal if the number of times of stopping does not reach the predefined number of times, and completely stops the switching between the normal operation mode and the sleep mode based on the presence or absence of the detection signal if the number of times of stopping reaches the predefined number of times.

If the number of time of stopping reaches the predefined number of times (YES in step S23), due to high possibility that the human body detection sensor 50 is malfunctioning or performing false detection, the image forming apparatus 1 completely stops operation of the human body detection sensor 50 or changes the detection range of the human body detection sensor 50 (steps S27 to S33). Here, completely stopping the operation of the human body detection sensor 50 means that the switching between the normal operation mode and the sleep mode based on the presence or absence of the detection signal is not restarted, excluding a case where the reception section 104 receives an instruction for restarting the switching between the normal operation mode and the sleep mode based on the presence or absence of the detection signal.

Figure 7:
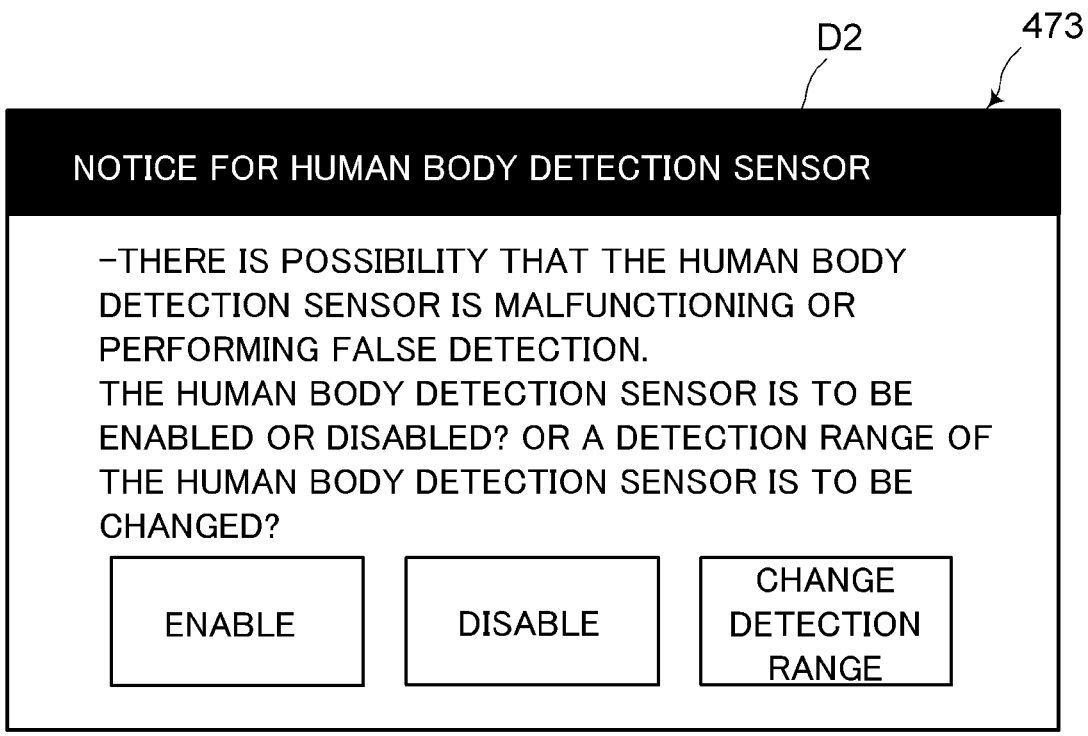
FIG. 7 is a view showing one example of the alarm screen displayed at the display section of the image forming apparatus as one example of the electronic device according to one embodiment of this disclosure.

In the processing of step S27, the display control section 103 displays an alarm screen D2 (see FIG. 7) at the display section 473. The alarm screen D2 plays a role not only as a screen for alarming possibility that the human body detection sensor 50 is malfunctioning or performing false detection but also as a selection screen for accepting selection on whether or not to completely stop the switching between the normal operation mode and the sleep mode based on the presence or absence of the detection signal and as a selection screen for accepting selection on whether or not to change the detection range of the human body detection sensor 50.

After the display of the alarm screen D2, it is determined whether or not the reception section 104 receives an instruction for restarting or continuously stopping the switching of the operation mode based on the presence or absence of the detection signal (step S28).

If the reception section 104 receives the instruction for continuously stopping the switching of the operation mode based on the presence or absence of the detection signal in the processing of step S28 (NO in step S29), the mode switching section 101 continuously stops the switching between the normal operation mode and the sleep mode based on the presence or absence of the detection signal (step S33), ending the processing.

If the reception section 104 receive the instruction for restarting the switching of the operation mode based on the presence or absence of the detection signal in the processing of step S28 (YES in step S29), it is determined whether or not the reception section 104 receives, from an operator, an instruction for changing the detection range of the human body detection sensor 50 (step S30).

If the reception section 104 receives the instruction for changing the detection range (YES in step S30), the mode switching section 101 first changes the detection range of the human body detection sensor 50, and then restarts the switching of the operation mode based on the presence or absence of the detection signal (step S32). More specifically, the mode switching section 101 changes the detection range described above by changing, based on the instruction for the change received by the reception section 104, the aforementioned threshold value used for comparison with the voltage value of the voltage signal generated based on the infrared ray received by the human body detection sensor 50. After the processing of step S32, the processing returns to the processing of step S20.

On the other hand, if the reception section 104 does not receive the instruction for changing the detection range (NO in step S30), the mode switching section 101 restarts the switching of the operation mode based on the presence or absence of the detection signal without changing the detection range of the human body detection sensor 50 (step S31). Then the processing returns to the processing of step S20.

Note that the electronic device according to this disclosure is not limited to the configuration of the embodiment described above and thus can be modified in various ways.

For example, described in the above embodiment is the case where the reception section 104 receives, from the operator, the instruction for changing the detection range of the human body detection sensor 50, and the mode switching section 101 changes the detection range of the human body detection sensor 50 based on this instruction for change, but the electronic device according to this disclosure is not necessarily limited to this case.

In a case where the switching between the normal operation mode and the sleep mode based on the presence or absence of the detection signal is stopped based on the fact that the state in which the reception section 104 does not receive the operation made by use of the operation section 47 and also in the state in which the detection signal is outputted from the human body detection sensor 50 continues for the predefined period of time, it is assumed that the detection range of the human body detection sensor 50 is set wider than an appropriate range. Thus, in a case where the mode switching section 101 stops the switching between the normal operation mode and the sleep mode based on the presence or absence of the detection signal based on the fact that the state in which the reception section 104 does not receive the operation made by use of the operation section 47 and the state in which the detection signal is outputted from the human body detection sensor 50 continue for the predefined period of time, the detection range of the human body detection sensor 50 may be narrowed down.

Moreover, in a case where the switching between the normal operation mode and the sleep mode based on the presence or absence of the detection signal is stopped based on the fact that the reception section 104 receives the operation made by use of the operation section 47 in a state in which the detection signal is not outputted from the human body detection sensor 50, it is assumed that the detection range of the human body detection sensor 50 is set narrower than the appropriate range. Thus, in the case where the mode switching section 101 stops the switching between the normal operation mode and the sleep mode based on the presence or absence of the detection signal based on the fact that the state in which the reception section 104 does not receive the operation made by use of the operation section 47 and the state in which the detection signal is outputted from the human body detection sensor 50 continues for the predefined period of time, the detection range of the human body detection sensor 50 can be widened.

This permits setting of the detection range of the human body detection sensor 50 at the appropriate range without an instruction for changing the detection range of the human body detection sensor 50 from the operator.

Moreover, an image forming apparatus has been shown as one example of the electronic device in the embodiment described above, but the electronic device according to one embodiment of this disclosure is not necessarily limited to this case. The electronic device according to one embodiment of this disclosure can be applied to, in addition to the image forming apparatus, for example, a mobile terminal such as a tablet terminal or a smartphone, a personal computer, and a television.

Moreover, the power control programs described in the above embodiment may be stored in a computer-readable, non-temporary recording medium, for example, a hard disc, a CD-ROM, a DVD-ROM, or a semiconductor memory. In this case, the computer-readable, non-temporary recording medium recording the power control programs serves as one embodiment of this disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
   an operation section being operated by an operator;
   a reception section receiving an operation made by use of the operation section by the operator;
   a human body detection sensor outputting a detection signal upon detection that the operator has approached the electronic device; and
   a mode switching section, based on presence or absence of the detection signal from the human body detection sensor, switching the electronic device between a normal operation mode permitting a normal operation and a sleep mode in a power-saving state,
   wherein the mode switching section:
      stops the switching in a case where a state in which the reception section does not receive the operation made by use of the operation section and a state in which the detection signal is outputted from the human body detection sensor continues for a predefined period of time, and
      continues a control of stopping the switching for a predefined period of time, and restarts the switching after passage of the predefined period of time, and
   in a case where an operation of restarting the switching is performed a predefined number of times, the mode switching section does not restart the switching when the switching is subsequently stopped excluding a case where an operation instruction for restarting the switching is received.

2. The electronic device according to claim 1, wherein the mode switching section further stops the switching in a case where the reception section receives the operation made by use of the operation section in a state in which the detection signal is not outputted from the human body detection sensor.

3. The electronic device according to claim 1, wherein, in a case where the mode switching section stops the switching, the reception section receives from the operator an instruction for selecting either of control of maintaining a state in which the switching is stopped and control of restarting the switching.

4. The electronic device according to claim 1, wherein, in a case where the mode switching section stops the switching, the reception section receives from the operator an instruction for changing a detection range of the human body detection sensor.

5. The electronic device according to claim 1, further comprising
   a display control section controlling a display section and a display operation performed by the display section,
   wherein, in a case where the mode switching section stops the switching, the display control section displays, at the display section, an alarm screen alarming the case.

6. The electronic device according to claim 1, wherein, in a case where the mode switching section stops the switching, the mode switching section performs switching from the normal operation mode to the sleep mode when execution of predefined kinds of jobs by the electronic device and reception of the operation made by use of the operation section by the reception section are not performed for a predefined period of time, and the mode switching section performs switching from the sleep mode to the normal operation mode when either of the execution of the predefined kinds of jobs by the electronic device and the reception of the operation made by use of the operation section by the reception section is performed.

7. The electronic device according to claim 1, wherein, in a case where the mode switching section stops the switching, the mode switching section narrows down a detection range of the human body detection sensor based on fact that a state in which the reception section does not receive the operation made by use of the operation section and a state in which the detection signal is outputted from the human body detection sensor continues for a predefined period of time.

8. The electronic device according to claim 1, wherein, the mode switching section further stops the switching in a case where the reception section receives the operation made by use of the operation section in a state in which the detection signal is not outputted from the human body detection sensor, and in a case where the mode switching section stops the switching, the mode switching section widens a detection range of the human body detection sensor based on fact that the reception section receives the operation made by use of the operation section in a state in which the detection signal is outputted from the human body detection sensor.

* * * * *